(12) United States Patent
Kawahara et al.

(10) Patent No.: US 6,616,520 B1
(45) Date of Patent: Sep. 9, 2003

(54) POLISHING CLOTH AND METHOD FOR ATTACHING/DETACHING THE POLISHING CLOTH TO/FROM POLISHING MACHINE BASE PLATE

(75) Inventors: Shinichiro Kawahara, Nara (JP); Toshiaki Kasazaki, Nara (JP); Naoyuki Tani, Nara (JP); Takashi Ando, Nara (JP); Masayoshi Yamamoto, Nara (JP)

(73) Assignee: Nitta Corporation, Osaka (JP)

( * ) Notice: Subject to any disclaimer, the term of this patent is extended or adjusted under 35 U.S.C. 154(b) by 0 days.

(21) Appl. No.: 09/786,007

(22) PCT Filed: Aug. 27, 1999

(86) PCT No.: PCT/JP99/04660
§ 371 (c)(1),
(2), (4) Date: Jun. 4, 2001

(87) PCT Pub. No.: WO00/12642
PCT Pub. Date: Mar. 9, 2000

(30) Foreign Application Priority Data

Aug. 28, 1998 (JP) .............................. 10-244105

(51) Int. Cl.[7] .............................. B24D 11/00
(52) U.S. Cl. ............... 451/538; 451/553; 451/534; 451/537
(58) Field of Search .............. 451/538, 537, 451/534, 533

(56) References Cited

U.S. PATENT DOCUMENTS 6,190,746 B1 * 2/2001 Ishii et al.

FOREIGN PATENT DOCUMENTS

| EP | 0 418 093 | 3/1991 | ............ B24D/3/20 |
| EP | 0 513 772 | 11/1992 | ............ B24D/3/00 |
| JP | 06-510548 | 11/1994 | .......... C09J/151/00 |
| WO | WO 92/13901 | 8/1992 | ............ C08F/8/00 |
| WO | WO 96/33842 | 10/1996 | ........... B24D/11/00 |
| WO | WO 00/12643 | 3/2000 | ............ C09J/7/02 |
| WO | WO 00/17284 | 3/2000 | ............ C09J/7/02 |

OTHER PUBLICATIONS

S.M. Aharoni, "Rigid Backbone Polymers. 2. Polyisocyanates and Their Liquid–Crystal Behavior," *Macromolecules*, 12, pp. 94–103 (1979).

F. Andruzzi et al., "Studies on Comb–Like Polymers. 2. Poly(octadecylethylene oxide)," *Macromolecules*, 13, pp. 15–18 (1980).

(List continued on next page.)

*Primary Examiner*—Joseph J. Hail, III
*Assistant Examiner*—Willie Berry, Jr.
(74) *Attorney, Agent, or Firm*—Fish & Neave; James F. Haley, Jr.; Nina R. Horan

(57) ABSTRACT

A polishing cloth includes: a polishing cloth substrate; a first-pressure adhesive layer formed on a back face of the polishing cloth substrate; as support formed on a back face of the first pressure-sensitive adhesive layer; a second pressure-sensitive adhesive layer formed on a back face of the support; and a release sheet releasably attached to the second pressure-sensitive adhesive layer. The second pressure-sensitive adhesive layer includes an adhesive composition. The adhesive composition contains a pressure-sensitive adhesive and a side-chain crystallizable polymer so that the side-china crystallizable polymer is present in an amount of about 1% to about 30% by weight based on the adhesive composition. The side-chain crystallizable polymer includes as a main component thereof an acrylic acid ester and/or methacrylic acid ester which has a straight-chain alkyl group including 16 or more carbon atoms as a side chain.

2 Claims, 1 Drawing Sheet

OTHER PUBLICATIONS

J.I. González de la Campa et al., "Side–Chain Crystallinity, Heat of Melting, and Thermal Transitions in Poly [N–(10–n–Alkyloxycarbonyl–n–Decyl) Maleimides] (PEMI)," *Journal of Polymer Science*, 18, pp. 2197–2207 (1980).

V.V. Chupov et al., "Structure and Physico–Chemical Properties of Comb–Like Polypeptides based on Poly–L–L-ysine," *Polymer Science U.S.S.R.*, 21, pp. 241–252 (1979).

S.A. Greenberg and T. Alfrey, "Side Chain Crystallization of n–Alkyl Polymethacrylates and Polyacrylates," *Journal of the American Chemical Society*, 76, pp. 6280–6285 (1955).

E.F. Jordan, Jr. et al., "Side–Chain Crystallinity. I. Heats of Fusion and Melting Transitions on Selected Homopolymers Having Long Side Chains," *Journal of Polymer Science*, 9, pp. 1835–1851 (1971).

E.F. Jordan, Jr. et al., "Side–Chain Crystallinity. II. Heats of Fusion and Melting Transitions on Selected Copolymers Incorporating n–Octadecyl Acrylate or Vinyl Stearate," *Journal of Polymer Science*, 9, pp. 3349–3365 (1971).

E.F. Jordan, Jr., "Side–Chain Crystallinity. III. Influence of Side–Chain Crystallinity on the Glass Transition Temperatures of Selected Copolymers Incorporating n–Octadecyl Acrylate or Vinyl Stearate," *Journal of Polymer Science*, 9, pp. 3367–3378 (1971).

E.F. Jordan, Jr. et al., "Side–Chain Crystallinity. IV. Mechanical Properties and Transition Temperatures of Copolymers of Methyl Methacrylate with Higher n–Alkyl Acrylates and N–n–Alkylacrylamides," *Journal of Polymer Science*, 10, pp. 1657–1679 (1972).

E.F. Jordan, Jr., "Side–Chain Crystallinity. V. Heats of Fusion and Melting Temperatures on Monomers Whose Homopolymers Have Long Side Chains," *Journal of Polymer Science*, 10, pp. 3347–3366 (1972).

P.L. Magagnini et al., "Studies on Comb–Like Polymers. 1. Poly(octadecylethylene)," *Macromolecules*, 13, pp. 12–15 (1980).

C.G. Overberger et al., "The Preparation and Polymerization of p–Alkylstyrenes. Effect of Structure on the Transition Temperatures of the Polymers," *Journal of The American Chemical Society*, 75, pp.3326–3330 (1953).

A.G. Pittman and B.A. Ludwig, "Effect of Polymer Crystallinity on the Wetting Properties of Certain Fluoroalkyl Acrylates," *Journal of Polymer Science*, 7, pp. 3053–3066 (1969).

N.A. Platé and V.P. Shibaev, "Comb–Like Polymers. Structure and Properties," *Journal of Polymer Science: Macromolecular Reviews*, 8, pp. 117–253 (1974).

J.F. Rabolt et al., "Studies of Chain Conformational Kinetics in Poly(di–n–alkylsilanes) by Spectroscopic Methods. 1. Poly(di–n–hexylsilane), Poly(di–n–heptylsilane), and Poly-(di–n–octylsilane)," *Macromolecules*, 19, pp. 611–616 (1986).

K. Yokota and T. Hirabayashi, "Widely–Spaced Comb–Like Polymers Having Fluoroalkyl Side Chains," *Polymer Journal*, 17, pp. 991–996 (1985).

* cited by examiner

POLISHING CLOTH AND METHOD FOR ATTACHING/DETACHING THE POLISHING CLOTH TO/FROM POLISHING MACHINE BASE PLATE

TECHNICAL FIELD

The present invention relates to a polishing cloth which is attached to a base plate of a polishing machine so as to hold a workpiece (e.g., a semiconductor wafer) in place while the workpiece is polished, and a method for attaching/detaching the polishing cloth to/from the base plate of the polishing machine.

BACKGROUND ART

In recent years, in the semiconductor industry, the integration level of ICs has rapidly increased. It has increased from 4M to 16M and is now proceeding to the 64M level.

In light of the above circumstances, improvement in the surface quality of a wafer (on which ICs are formed) has been demanded under stringent cost restraints. In order to increase the integration level of ICs, it is necessary to reduce the minimum width that is allowed for devices to be mounted on the wafer, as well as improving the chemical and electrical properties of the wafer. The ideal value for the minimum width has shifted from about 0.5 microns to about 0.35 microns. Moreover, the wafer size has rapidly increased, followed by a rapid reduction in cost per bit. The increase in wafer size has also resulted in a remarkable increase in the size of machines used for processing wafers. For example, in a polishing process for mirror-finishing a wafer surface, a polishing machine with a base plate having a diameter of about 42 inches is used to polish 5'-diameter wafers, whereas a polishing machine with a base plate having a diameter as large as about 59 inches is used to polish 8'-diameter wafers. In general, the polishing of wafers is achieved by causing friction with a polishing cloth in the presence of a polishing slurry, while the polishing cloth is retained on a lower base plate of a polishing machine and the wafer to be processed is retained on an upper base plate of the polishing machine.

Accordingly, the size of the polishing cloth is typically the same as that of the lower base plate of the polishing machine. Specifically, a polishing cloth with a diameter of about 42 inches is generally used for polishing 5'-diameter wafers, whereas a polishing cloth with a diameter of about 59 inches is used for polishing 8'-diameter wafers.

In general, the polishing cloth is secured to the base plate of the polishing machine with a high-performance double-sided adhesive tape (i.e., a tape having adhesive layers on the both sides). In this securing method, however, the adhesive layer provided on the back face of the polishing cloth is adhered to the base plate surface so firmly that a tack strength as large as about 2 to 3 kg/inch width exists when the polishing cloth thus attached to the base plate must be detached in a usual manner. In other words, a force up to about 156 kg may be required to detach a polishing cloth from a base plate having a diameter of about 42 inches, and a force up to about 180 kg may be required to detach a polishing cloth from a base plate having a diameter of about 59 inches. Thus, it is very troublesome when a used polishing cloth must be exchanged with a new one.

On the other hand, if a polishing cloth fails to be attached in proper alignment with respect to the base plate, it has been difficult to reposition and reattach the polishing cloth.

DISCLOSURE OF THE INVENTION

A polishing cloth according to the present invention includes: a polishing cloth substrate; a first pressure-sensitive adhesive layer formed on a back face of the polishing cloth substrate; a support formed on a back face of the first pressure-sensitive adhesive layer; a second pressure-sensitive adhesive layer formed on a back face of the support; and a release sheet releasably attached to the second pressure-sensitive adhesive layer, wherein the second pressure-sensitive adhesive layer includes an adhesive composition, the adhesive composition containing a pressure-sensitive adhesive and a side-chain crystallizable polymer so that the side-chain crystallizable polymer is present in an amount of about 1% to about 30% by weight based on the adhesive composition, and the side-chain crystallizable polymer including as a main component thereof an acrylic acid ester and/or methacrylic acid ester which has a straight-chain alkyl group including 16 or more carbon atoms as a side chain.

In one embodiment of the invention, the adhesive composition contains a tackifier in an amount of about 10% to about 30% by weight; and the adhesiveness of the adhesive composition is decreased by more than about 90% when heated above about 50° C.

In another embodiment of the invention, the side-chain crystallizable polymer has a molecular weight of about 2,000 to about 15,000.

In still another embodiment of the invention, the side-chain crystallizable polymer has a melting point which occurs within a temperature range narrower than about 15° C.

Alternatively, the polishing cloth according to the present invention includes: a polishing cloth substrate; a pressure-sensitive adhesive layer formed on one face of the polishing cloth substrate; and a release sheet releasably attached to the pressure-sensitive adhesive layer, wherein the pressure-sensitive adhesive layer includes an adhesive composition, the adhesive composition containing a pressure-sensitive adhesive and a side-chain crystallizable polymer so that the side-chain crystallizable polymer is present in an amount of about 1% to about 30% by weight based on the adhesive composition, and the side-chain crystallizable polymer including as a main component thereof an acrylic acid ester and/or methacrylic acid ester which has a straight-chain alkyl group including 16 or more carbon atoms as a side chain.

In one embodiment of the invention, the adhesive composition contains a tackifier in an amount of about 10% to about 30% by weight; and adhesiveness of the adhesive composition is decreased by more than about 90% when heated above about 50° C.

In another embodiment of the invention, the side-chain crystallizable polymer has a molecular weight of about 2,000 to about 15,000.

In still another embodiment of the invention, the side-chain crystallizable polymer has a melting point which occurs within a temperature range narrower than about 15° C.

In another aspect of the invention, there is provided a method for attaching/detaching any one of the above polishing cloths to/from a base plate of a polishing machine, including the steps of: attaching the polishing cloth to the base plate of the polishing machine by allowing the pressure-sensitive adhesive of the polishing cloth to the base plate surface maintained at temperature T1; and detaching the polishing cloth from the base plate maintained at temperature T2 which is higher than temperature T1.

The present invention provides the following effects.

According to one embodiment of the present invention, a polishing cloth is provided which includes an adhesive layer composed essentially of an adhesive composition containing a pressure-sensitive adhesive and a side-chain crystallizable polymer, where the side-chain crystallizable polymer is present in the amount of about 1% to about 30% by weight based on the adhesive composition. The side-chain crystallizable polymer includes as a main component thereof an acrylic acid ester and/or methacrylic acid ester which has a straight-chain alkyl group including 16 or more carbon atoms as a side chain. As a result, the polymer is capable of shifting between a crystal state and an amorphous state in a reversible manner, responsive to a relatively small temperature change from an arbitrarily selected ordinary temperature value; consequently, the polymer exhibits drastic a change in its tackiness to the base plate surface.

Thus, when the polishing cloth is heated to a predetermined elevated temperature (e.g., about 50° C. to about 100° C.), the adhesiveness of the adhesive layer rapidly decreases. Therefore, at the time of exchanging polishing cloths, the base plate and/or the polishing cloth may be heated so as to greatly decrease the adhesiveness of the adhesive layer with respect to the base plate surface, whereby the polishing cloth can be easily peeled off the base plate surface.

In accordance with an embodiment of the invention where the adhesive composition contains a tackifier in the amount of about 10% to about 30% by weight and where the adhesiveness of the adhesive composition is decreased by more than about 90% when heated above about 50° C., a predetermined level of adhesiveness with respect to the base plate surface can be retained at ordinary temperatures, whereas a rapid decrease in adhesion strength can be caused by heating. Thus, a tackifier present in the above-mentioned amount will not substantially influence the temperature sensitivity of the polymer. As a result, the adhesive composition according to the present invention exhibits a sufficient adhesion strength at ordinary temperatures, while maintaining a good balance between the adhesion strength at ordinary temperatures and the peeling force required at elevated temperatures.

Thus the invention described herein makes possible the advantages of (1) providing a polishing cloth which adheres strongly, stably, and precisely to a base plate of a polishing machine while a wafer or the like is polished with the polishing cloth, and yet allows for easy detachment from the base plate; (2) providing a method for attaching/detaching such a polishing cloth to/from a base plate of a polishing machine; (3) providing a polishing cloth which can be easily repositioned and reattached for proper alignment with respect to a base plate of a polishing machine; and (4) providing a method for attaching/detaching such a polishing cloth to/from a base plate of a polishing machine.

These and other advantages of the present invention will become apparent to those skilled in the art upon reading and understanding the following detailed description with reference to the accompanying figures.

BEST MODES FOR CARRYING OUT THE INVENTION

Figure 2:
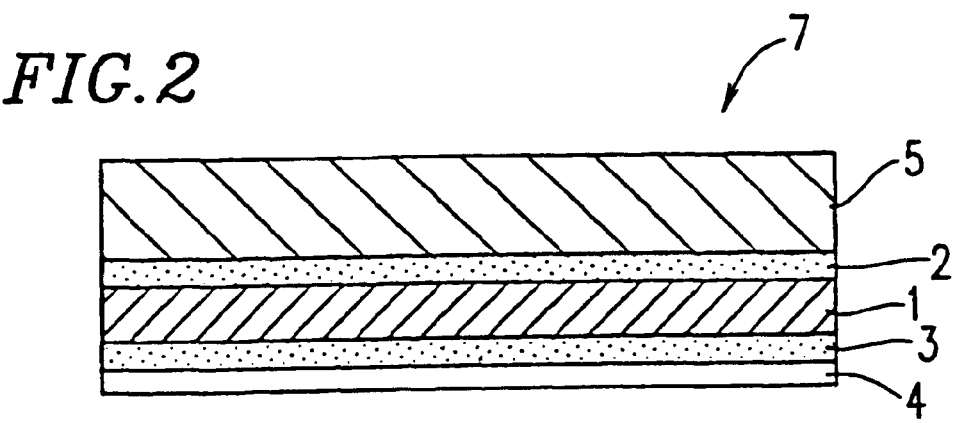
FIG. 2 is a cross-sectional view illustrating a polishing cloth according to one example of the present invention.
Figure 3:
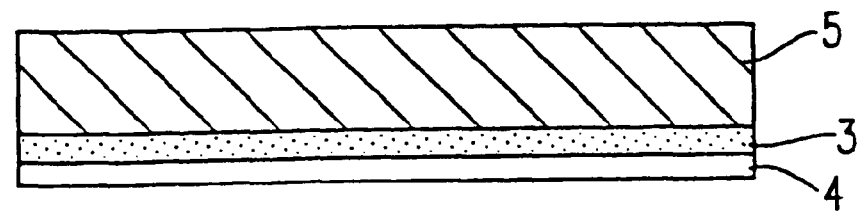
FIG. 3 is a cross-sectional view illustrating a polishing cloth according to another example of the present invention.

Referring to FIG. 3, the polishing cloth of the present invention at least includes a polishing cloth substrate 5 and a pressure-sensitive adhesive layer 3. In addition, a release sheet 4 may be releasably attached to the pressure-sensitive adhesive layer 3. In addition, a support may be provided in a middle portion of the composite along the thickness direction for reinforcement of the pressure-sensitive adhesive layer and the like. In this case, as shown in FIG. 2, the polishing cloth may include a first pressure-sensitive adhesive layer 2 (which can be composed of a commercially available adhesive) formed on the back face of the polishing cloth substrate 5, a support 1 formed on the back face of the first pressure-sensitive adhesive layer 2, a second pressure-sensitive adhesive layer 3 (composed of the inventive pressure-sensitive adhesive) formed on the back face of the support 1, and a release sheet 4.

(Polishing Cloth Substrate)

The substrate of the polishing cloth of the present invention is formed of a composition containing at least one polymer selected from the group consisting of polyurethane resin, epoxy resin, and vinyl resin (for example, a foam body). Alternatively, the substrate of the polishing cloth of the present invention may be formed of a composite of the above composition and a base material. Examples of such foam bodies and composites are described in detail as follows.

(1) Foam Body

The foam body may be formed, for example, by solidifying a foam composition containing urethane polymer and dimethylformamide by a wet solidification method. Alternatively, a foam composition containing urethane polymer, vinyl polymer (such as vinyl chloride polymer, vinyl chloride-vinyl acetate copolymer, and vinyl chloride-vinyl acetate-vinyl alcohol ternary polymer), and a suitable foam solvent such as dimethylformaldehyde may be used to form a foam body by the wet solidification method. The surface area of the foam body, especially a skin layer formed on the surface, is preferably subjected to buffing so that a foam structure is exposed.

As the urethane polymer, any of polyether urethane resins, polyester urethane resins, and polyesterether urethane resins can be used. Examples of a polyol component used for the production of the urethane resin include poly(oxyethylene glycol), poly(oxypropylene glycol), poly(oxytetramethylene glycol), polyethylene adipate, polypropylene adipate, and poly(oxytetramethylene adipate). Examples of an isocyanate component used in the production of the urethane resin include 4,4'-diphenylmethane diisocyanate, and 2,4-tolylene diisocyanate.

Examples of a chain expander used in the production of the urethane resin include ethylene glycol, 1,4-butanediol, and propylene glycol.

For example, poly(oxypropylene glycol) is used as the polyol component, 4,4'-diphenylmethane diisocyanate as the isocyanate component, 1,4-butanediol as the chain expander, ethanol as a polymerization inhibitor, and dimethylformamide as a solvent, to form a dimethylformamide solution of urethane polymer.

The foam composition may contain a filler such as carbon black, a dispersion stabilizer such as a surfactant, and a wet solidification auxiliary.

After applying the resultant foam composition on a support whose surface portion allows for releasing, a foam body can be obtained by using a wet solidification method described below, for example:

The support with the foam composition applied thereon is immersed in water maintained at a predetermined temperature and then in hot water maintained at a predetermined temperature for a predetermined period of time. During immersion, water replaces the solvent contained in the foam composition through osmosis, thereby removing the solvent from the foam composition and subduing the foaming of the foam composition. Thus, an elastic foam body layer is formed on the support. The resultant support having the foam body formed thereon is taken out from the water, dried with hot air at a predetermined temperature for a predetermined period of time, and buffed to give the foam body.

(2) Composite

The composite can be produced by impregnating a base material with the above foam composition and solidifying the resultant material by the wet solidification method as described in paragraph (1) above. As the base material, fabrics such as a non-woven fabric (for example, BS-300, Nippon Felt Co., Ltd.) can be used.

(Support)

As a support, various synthetic resin sheets can be used, e.g., polyethylene terephthalate, polyether imide, or polyurethane. For example, a polyester film designated "Lumirror" (manufactured by Toray Industries, Inc.) may be used.

(Pressure-sensitive Adhesive Layer)

The second pressure-sensitive adhesive layer used for the present invention is formed directly or indirectly on the back face of the polishing cloth substrate. In the case where the second pressure-sensitive adhesive is formed indirectly on the back face of the polishing cloth substrate, a common pressure-sensitive adhesive layer (first pressure-sensitive adhesive layer) and a support may be interposed between the second pressure-sensitive adhesive layer and the back face of the polishing cloth substrate.

Examples of pressure-sensitive adhesives contained in the adhesive composition composing the second pressure-sensitive adhesive layer include the following materials: natural rubber adhesives; styrene/butadiene latex-base adhesives; ABA block copolymer type thermoplastic rubbers (where A represents a thermoplastic polystyrene end block; and B represents a rubber intermediate block such as polyisoprene, polybutadiene or poly(ethylene/butylene)); butyl rubber; polyisobutylene; acrylic adhesives such as polyacrylate and vinyl acetate/acryl ester copolymer; and vinylether copolymers such as polyvinylmethylether, polyvinylethylether, and polyvinylisobutylether.

Especially preferable are acryl type pressure-sensitive adhesives composed essentially of ethylhexyl acrylate, hydroxyethyl acrylate, or the like. The use of acryl type pressure-sensitive adhesives provides interaction with the polymer such that the polymer will so be sufficiently dispersed within the adhesive layer at a predetermined temperature so as to exhibit sufficient tackiness, and yet that the polymer will easily bleed out when heated to a temperature above the predetermined temperature.

(Side-chain Crystallizable Polymer)

As a side-chain crystallizable polymer to be contained in the adhesive composition, those which have a melting point which occurs within a temperature range narrower than about 15° C. (also referred to as "first-order melting transition") are preferably used. An adhesive composition containing such a polymer is disclosed in Japanese National Phase PCT Laid-open Publication No. 6-510548.

As used herein, the term "melting point" means the temperature at which an equilibrium process causes certain portions of a polymer, initially aligned in an ordered array, to become disordered. In one embodiment, preferably, the melting point of the polymer is in the range of about 40° C. to about 100° C., more preferably in the range of about 40° C. to 60° C. It is preferable that the melting occur rapidly, i.e., over a relatively narrow temperature range which is less than about 10° C. and preferably less than about 5° C. It is preferable that the polymer crystallizes rapidly. To this end, seeding agents, or crystallization catalysts can be incorporated into the polymer.

After use, the polishing cloth according to the present invention can be readily peeled off the surface of the polishing machine base plate by simply heating the polishing cloth to a temperature (hereinafter referred to as an "elevated temperature") which is slightly higher than the use temperature. The elevated temperature is usually about 40° C. to about 100° C., preferably about 40° C. to about 60° C.

The present invention is based on the finding that it is possible to obtain an adhesive composition whose adhesiveness controllably varies with temperature by mixing a crystallizable polymer of certain physicochemical properties with a pressure-sensitive adhesive.

The most preferable side-chain crystallizable polymer to be used according to the present invention contains repeating units of the formula below:

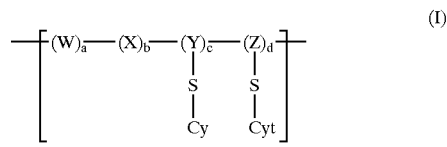

(I)

In formula (I), W and X represent first and second monomer units, respectively, each of which may be any molecular moiety connectable to an adjoining molecular moiety (i.e., polymerizable). Y and Z each independently represent a backbone monomer unit which may be any molecular moiety or atom. Each S independently represents a linking group or spacer unit which may optionally be present. Cyt and Cy each independently represent a crystallizable moiety which is connected to the respective backbone either directly or via the spacer unit. Variables a, b, c, and d each independently represent an integer in the range of 0 to 1,000 with the proviso that sufficient Cyt and Cy are present so as to provide a molecular weight which is equal to or greater than twice the sum of the molecular weights of W, X, Y and Z. The polymers have a heat of fusion ($\Delta$Hf) of at least about 20 Joules/g. In the case where variables a, b, c, and d are all greater than 1, monomer units W, X, Y, and Z each define a repeating unit or a mixture of different monomer units. For example, in the case where a is 100, W may be a 5:5:2:5:83 mixture of styrene, acrylic acid, methylstyrene, and hexadecylacrylate. Accordingly, any of monomer units W, X, Y, and Z may be a mixture of polymerizable monomers.

The adhesive composition according to the present invention may optionally be cross-linked. Cross-linking may be effected by any known technique, such as using a cross-linking agent, heating, or radiation.

The backbone of the polymer (represented as W, X, Y, and Z in formula (I)) may be any organic structure (aliphatic or aromatic hydrocarbon, ester, ether, amide, etc.) or an inorganic structure (sulfide, phosphazine, silicone, etc.). The spacer linkages can be any suitable organic or inorganic units, for example, ester, amide, hydrocarbon, phenyl, ether, or inorganic salt (e.g., a carboxyl-alkyl ammonium or sulphonium or phosphonium ion pair, or other known ionic salt pair). The side-chain (represented as Cyt and Cy, and an optionally present S in formula (I)) may be aliphatic or aromatic, or a combination of aliphatic side-chains of at least 10 carbon atoms, fluorinated aliphatic side-chains of at least 6 carbon atoms, and p-alkyl styrene side-chains wherein the alkyl group contains 8 to 24 carbon atoms.

The length of each side-chain moiety is usually greater than about 5 times the distance between side-chains in the case of acrylates, methacrylates, vinyl esters, acrylamides, methacrylamides, vinyl ethers, and alpha olefins. In the extreme case of a fluoroacrylate alternate copolymer with butadiene, a side-chain can be as little as 2 times the length of the distance between branches. In any case, the side-chain unit should account for more than about 50% of the volume of the polymer, preferably greater than about 65% of the volume. Co-monomers added to a side-chain polymer usually have an adverse effect on crystallinity. Small amounts (usually about 10% to about 25% by volume) of various comonomers can be tolerated. In some cases, it may be preferable to add a small amount of comonomer, e.g., a cure site monomer such as acrylic acid, glycidal methacrylate, maleic anhydride, an amino functional monomer, and the like.

Examples of side-chain crystallizable monomers which fall within the above-described categories include acrylate, fluoroacrylate, methacrylate and vinyl ester polymers such as those described in J. Poly. Sci. 10: 3347 (1972); J. Poly. Sci. 10: 1657 (1972); J. Poly. Sci. 9: 3367 (1971); J. Poly. Sci. 9: 3349 (1971); J. Poly. Sci. 9: 1835 (1971); J.A.C.S. 76: 6280 (1954): J. Poly. Sci. 7: 3053. (1969); J. Poly. Sci. 17: 991 (1985), corresponding acrylamides, substituted acrylamide and maleimide polymers (J. Poly. Sci.: Poly. Physics Ed. 18: 2197 (1980); poly($\alpha$-olefin) polymers such as those described in J. Poly. Sci.: Macromol. Rev. 8: 117–252 (1974) and Macromolecules 13: 12 (1980), polyalkyl-vinylethers, polyalkylethylene oxides such as those described in Macromolecules 13: 15 (1980), alkylphosphazene polymers, polyamino acids such as those described in J. Poly. Sci. USSR 21: 241 (1979), Macromolecules 18: 2141(1985), polyisocyanates such as those described in Macromolecules 12: 94 (1979), polyurethanes made by reacting amine- or alcohol-containing monomers with long-chain alkyl isocyanates, polyesters and polyethers, polysiloxanes and polysilanes such as those described in Macromolecules 19: 611 (1986), and p-alkylstyrene polymers such as those described in J.A.C.S. 75: 3326 (1953), and triglycerides such as tristearin or pentaerythritol tetrastearate.

Particularly preferable side-chain crystallizable polymers to be used for the present invention include linear aliphatic C14–C50 (having 14 to 50 carbon atoms) polyacrylates, linear aliphatic C14–C50 polymethacrylates, linear aliphatic C14–C50 polyacrylamides, and linear aliphatic C14–C50 polymethacrylamides. Especially preferable among these are linear aliphatic C16–C22 polyacrylates, linear aliphatic C16–C22 polymethacrylates, linear aliphatic C16–C22 polyacrylamides, and linear aliphatic C16–C22 polymethacrylamides.

As described above, the melting point of the selected crystallizable polymer defines a use temperature range, within which the composition exhibits tackiness. The amount of the crystallizable polymer incorporated in the adhesive composition has surprisingly little effect on the position or the breadth of this range.

The transition temperatures of some selected side-chain crystallizable polymers are listed below:

| polymer | transition temperature (° C.) |
| --- | --- |
| C16 acrylate | 36 |
| C16 methacrylate | 26 |
| C18 acrylate | 49 |
| C18 methacrylate | 39 |
| C20 acrylate | 60 |
| C20 methacrylate | 50 |
| C22 acrylate | 71 |
| C22 methacrylate | 62 |

See E. F. Jordan et al. "SIDE-CHAIN CRYSTALLIZATION DEGREE II", J. Poly. Sci. Section A-1, 9: 33551 (1971). Examples in this literature describe a method for producing a crystallizable polymer in detail.

The molecular weight of the crystallizable polymer to be used is an important factor that determines the manner in which the adhesive composition of the present invention exhibits temperature-dependent tackiness and/or adhesion strength. Specifically, a low molecular weight crystallizable polymer will advantageously lose bonding strength when heated. If such property is desirable, the molecular weight of the polymer is preferably in the range of 2,000 to 15,000, and more preferably in the range of 3,000 to 10,000.

The adhesive compositions useful for the present invention may contain, in addition to one or more of the polymers described above, conventional additives such as tackifiers (wood rosin, polyesters, etc.), antioxidants, fibrous or non-fibrous fillers, colorants, and the like. It is also possible to include additional adhesives in the adhesive composition so long as the overall temperature sensitivity profile is not significantly affected thereby. The amount of crystallizable polymer in the adhesive composition is preferably in the range of about 1% by weight to about 30% by weight, more preferably in the range of about 5% by weight to about 20% by weight, and in particular in the range of about 5% by weight to about 15% by weight. If the polymer content in the adhesive composition is less than about 1% by weight or more than about 30% by weight, the above-described effects of the polymer may not be exhibited.

The adhesive compositions of the present invention may be prepared by admixing a pressure-sensitive adhesive and a crystallizable polymer in a compatible solvent and adding optional components thereto, e.g., a plasticizer, a tackifier, and/or a filler. The solid contents are adjusted to the desired viscosity, and the mixture is blended until it is homogeneous. After blending, bubbles are removed from the mixture.

Examples of tackifiers include special rosin ester type tackifiers, terpene phenol type tackifiers, petroleum resin type tackifiers, high hydroxyl value rosin ester type tackifiers, hydrogenated rosin ester type tackifiers, and the like. Examples of commercial products include a special rosin ester type tackifier designated Super Ester A125 (Arakawa Chemical K.K.), a terpene phenol type tackifier designated Tamanoru 803L (Arakawa Chemical K.K.), a petroleum resin type tackifier designated Hiresin #90S (Toho Chemical Industry Co. Ltd.), a high hydroxyl value rosin ester type tackifier designated KE-364C (Arakawa Chemical K.K.), and a hydrogenated rosin ester type tackifier designated Estergum HD (Arakawa Chemical K.K.).

Particularly preferable are, special rosin ester type tackifiers. The amount of a tackifier to be added is preferably in the range of about 10% to about 30% by weight, more preferably about 15% to about 25%, based on the adhesive composition. If the tackifier content is less than about 10% by weight, sufficient adhesion strength may not be attained at ordinary temperatures. If the tackifier content is more than about 30% by weight, the rate of decrease of adhesion strength may not be sufficient at the time of peeling.

Preferable examples of a polymer contained in the adhesive composition include the following:

(1) a copolymer of 80 to 98 parts by weight of stearyl acrylate, 2 to 20 parts by weight of acrylic acid, and 2 to 10 parts by weight of dodecylmercaptan;
(2) a copolymer of 5 to 90 parts by weight of dococyl acrylate, 5 to 90 parts by weight of stearyl acrylate, 1 to 10 parts by weight of acrylic acid, and 2 to 10 parts by weight of dodecylmercaptan; and
(3) a copolymer of 80 to 98 parts by weight of dococyl acrylate, 2 to 20 parts by weight of acrylic acid, and 2 to 10 parts by weight of dodecylmercaptan.

Examples of pressure-sensitive adhesives to be contained in the adhesive composition include a copolymer containing 80 to 95 parts by weight of 2-ethylhexyl acrylate and 5 to 20 parts by weight of 2-hydroxyethyl acrylate.

A number of methods can be used to provide the adhesive layers on a polishing cloth substrate, e.g., spray deposition, painting, dipping, gravure printing, rolling or the like. The adhesive layers may also be transferred from a release sheet, as in the manner of transfer printing. The composition may be applied neat (i.e., without anything else), or in a suitable solvent, or as an emulsion or latex. Alternatively, a mixture of appropriate monomers and additives may be applied directly to a polishing cloth substrate and cured in situ by heat, irradiation, or other suitable processes known in the art.

In the case of composing the polishing cloth of four or more layers, the above-described second pressure-sensitive adhesive layer and a first pressure-sensitive adhesive layer (which may be composed of a commercially available adhesive) may be laminated on either face of a support, and a polishing cloth substrate may be further adhered to the first pressure-sensitive adhesive layer. As the first pressure-sensitive adhesive, the second pressure-sensitive adhesive may be used, for example; however, any other adhesive, in particular a rubber type adhesive, an acrylic type adhesive, or a semi-hotmelt adhesive can be used.

The polishing cloth produced in the above-described manner can be attached to a base plate of a polishing machine by a known method. For example, the polishing cloth can be mounted on the surface of the polishing machine base plate, which is maintained at an ordinary temperature T1 (e.g., about 20° C. to about 30° C.), by allowing the pressure-sensitive adhesive layer of the polishing cloth to be adhere thereto. After the polishing cloth is used, the polishing cloth can be detached from the base plate of the polishing machine while heating the base plate at an elevated temperature T2 which is higher than the ordinary temperature T1 by about 5° C. to about 10° C. Since the adhesive layer of the polishing cloth exhibits excellent adhesion at ordinary temperatures, the polishing cloth will not peel off the base plate surface at ordinary temperatures. When the polishing cloth needs to be peeled off the base plate surface, the base plate with the polishing cloth attached thereon may simply be heated above about 50° C., for example.

Following heating methods can be used, for example:
(1) Methods for Heating the Polishing Cloth Surface These methods may involve application of a heated iron, hot water, a heater sheet, hot air (e.g., from an air heater or a drier), steam, radiofrequency heating, and/or irradiation (infrared or far-infrared) by means of a lamp, for example.
(2) Methods for Applying Heat at the Interface Between the Polishing Cloth and the Base Plate These methods may involve application of a heated trowel, a heated iron, hot air (e.g., from an air heater or a drier), hot water, steam, and/or irradiation (infrared or far-infrared) by means of a lamp, for example.
(3) Methods for Heating the Base Plate These methods may involve forming conduits through the base plate for passing hot water therethrough, or arranging the base plate so as to function as a hot plate, for example. Alternatively, the base plate may be stored in an isothermal room kept at about 50° C. to about 100° C., or may be immersed in hot water kept at about 50° C. or above, for example. Thereafter, the heated polishing cloth can be peeled off the base plate.

The adhesion strength of the adhesive layer is about 1.5 to about 2.5 Kg/inch width at ordinary temperatures, whereas the peeling force at elevated temperatures is decreased to about 0.1 to about 0.5 Kg/inch width. Thus, the polishing cloth of the present invention can be easily peeled off the base plate surface. The peeling of the polishing cloth may be performed manually.

Hereinafter, the present invention will be specifically described by way of illustrative examples. In the following description, any reference to "part (s)" means "part(s) by weight".

A. Preparation of Polymer

Synthesis Example 1

First, 95 parts of stearyl acrylate, 5 parts of acrylic acid, 5 parts of dodecylmercaptan, and 1 part of Kayaester HP-70 (Kayaku Akzo K.K.) were mixed. The mixture was stirred at about 80° C. for about 5 hours to polymerize these monomers. The resultant polymer had a molecular weight of about 8,000, and a melting point of about 50° C.

Synthesis Example 2

First, 95 parts of dococyl acrylate, 5 parts of acrylic acid, 5 parts of dodecylmercaptan, and 1 part of Kayaester HP-70 (Kayaku Akzo K.K.) were mixed. The mixture was stirred at about 80° C. for about 5 hours to polymerize these monomers. The resultant polymer had a molecular weight of about 8,000, and a melting point of about 60° C.

Synthesis Example 3

First, 92 parts of 2-ethylhexyl acrylate, 8 parts of hydroxyethyl acrylate, and 0.3 parts of Trigonox 23-C70 (Kayaku Akzo K.K.) were mixed in 150 parts of ethyl acetate/heptane (70/30). The mixture was stirred at 55° C. for 3 hours and heated to about 80° C., and 0.5 parts of Kayaester HP-70 was added. The mixture was stirred for about 2 hours to polymerize these monomers. The resultant polymer had a molecular weight of about 600,000.

B. Preparation of a Polishing Cloth with a Double-sided Adhesive Tape

Example 1

Figure 1:
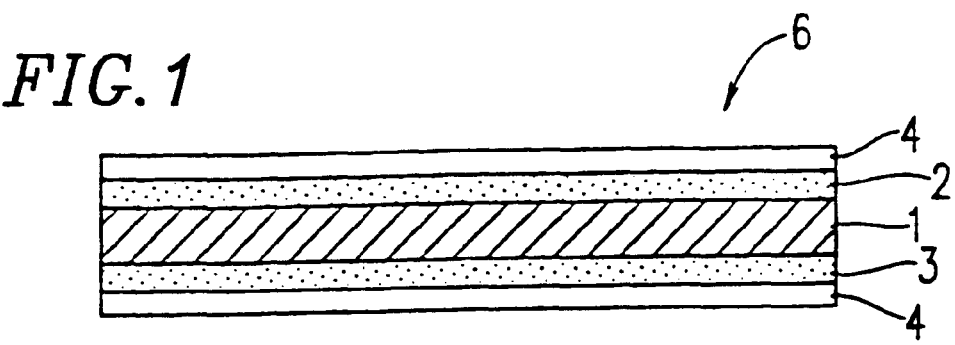
FIG. 1 is a cross-sectional view illustrating a double-sided adhesive tape used for producing a polishing cloth according to the present invention.

The polymers obtained in accordance with Synthesis Examples 1 and 3 were mixed at a ratio of 10:100 parts. To the resultant polymer solution, a cross-linking agent designated Coronate L45 (Nippon Polyurethane Industry Co., Ltd.) was added so that 0.3 parts of Coronate L45 was present against 100 parts of the polymer of Synthesis Example 3. As shown in FIG. 1, the resultant mixture was coated on one face of a support 1 (a PET film manufactured by Somar Co.) so as to have a thickness of about 40 μm, thereby forming an adhesive layer 3. On the other face of the support 1, a rubber type pressure-sensitive adhesive designated G5109A (NO-TAPE Industrial Co., Ltd.) was coated so as to have a thickness of about 40 μm, thereby forming a pressure-sensitive adhesive 2. Thus, a double-sided adhesive tape was produced. Furthermore, release sheets 4 were laminated on the adhesive layers 2 and 3 to give a double-sided adhesive tape 6 with release lining. Next, the release sheet 4 on the adhesive layer 2 was peeled, and thereafter the double-sided adhesive tape 6 was attached to a polishing cloth 5 (Suba 400 manufactured by Rodel Nitta Co.) so that the adhesive layer 2 adhered to the polishing cloth 5 as shown in FIG. 2. Thus, a polishing cloth 7 with a double-sided adhesive tape was obtained.

Next, the release sheet 4 on the adhesive layer 3 was peeled, and thereafter the adhesive layer 3 of the polishing cloth 7 was lightly attached to a lower base plate (diameter: about 59 inches) of a polishing machine (not shown) at about 25° C. Then, a dummy workpiece was polished with the polishing cloth 7 for a few minutes in order to develop intimacy between the adhesive layer 3 and the base plate. Thereafter, a wafer was processed with the polishing cloth 7 under the processing conditions shown in Table 1; specifically, fifty times of polishing (about 30 minutes each time) were repetitively performed.

After the polishing cloth 7 was used in the above-mentioned manner, hot water at about 60° C. was allowed to flow through the base plate, and the polishing cloth 7 was peeled off the base plate after the lapse of about 10 minutes. The polishing cloth 7 easily peeled with a maximum peeling force of about 9 Kg.

After the adhesive layer 3 of the polishing cloth 7 was once attached to the lower base plate of the polishing machine, it was possible to easily reposition and reattach the polishing cloth 7 by heating above about 60° C.

Examples 2 to 4

A polishing cloth with a double-sided adhesive tape was produced in the same manner as in Example 1 except that Superester A125 (Arakawa Chemical K.K.) was added as a tackifier in the amount of about 10% by weight (Example 2), about 20% by weight (Example 3), or about 30% by weight (Example 4), based on the polymer of Synthesis Example 3.

Next, the same polishing test as that in Example 1 was conducted, whereafter each polishing cloth was peeled. Each polishing cloth easily peeled with a maximum peeling force of about 10 Kg.

Examples 5 to 8

A polishing cloth with a double-sided adhesive tape was produced in the same manner as in Example 1 except that the polymers of Synthesis Examples 2 and 3 were mixed at the ratio of about 10:100 parts and that Superester A125 (Arakawa Chemical K.K.) was added as a tackifier in the amount of about 0% by weight (Example 5), about 10% by weight (Example 6), about 20% by weight (Example 7), or about 30% by weight (Example 8), based on the polymer of Synthesis Example 3.

Next, the same polishing test as that in Example 1 was conducted, whereafter each polishing cloth was peeled. Table 2 shows the added amounts of Superester A125, the peeling forces at an ordinary temperature (about 23° C.) and at an elevated temperature (about 70° C.), and the rate of decrease of the peeling force from the value exhibited at the elevated temperature relative to the value exhibited at the ordinary temperature.

Example 9

A polishing cloth with a double-sided adhesive tape was produced in the same manner as in Example 1 except that an acrylic type adhesive (R5542 manufactured by Ipposha Oil Industry Co., Ltd.) was used as a commercially available pressure-sensitive adhesive.

Next, the same polishing test as that in Example 1 was conducted, whereafter each polishing cloth was peeled. Table 2 shows the peeling forces at an ordinary temperature (about 23° C.) and at an elevated temperature (about 60° C.), and the rate of decrease of the peeling force from the value exhibited at the elevated temperature relative to that exhibited at the ordinary temperature.

Example 10

A polishing cloth with a double-sided adhesive tape was produced in the same manner as in Example 1 except that an acrylic type pressure-sensitive adhesive (AR-2108M-1, manufactured by RIKIDYNE Co., Ltd.) was used as a commercially available pressure-sensitive adhesive.

Next, the same polishing test as that in Example 1 was conducted, whereafter each polishing cloth was peeled. Table 2 shows the peeling forces at an ordinary temperature (about 23° C.) and at an elevated temperature (about 60° C.), and the rate of decrease of the peeling force from the value exhibited at the elevated temperature relative to that exhibited at the ordinary temperature.

Comparative Example

A commercially available double-sided adhesive tape (ST442 manufactured by Sumitomo 3M Ltd.), constructed so as to include a 50 μm-thick layer of a conventional adhesive coated on both sides of a 25 μm-thick polyester film (Lumirror manufactured by Toray Industries, Inc.), was obtained. This double-sided adhesive tape was attached on the back face of the polishing cloth substrate 5, thereby producing a polishing cloth with a double-sided adhesive tape.

The resultant polishing cloth was cut into a piece having a diameter of about 60 inches. The release sheet was peeled. Then, the polishing cloth was lightly attached to the lower base plate (diameter: about 59 inches) of a polishing machine at a temperature (adhesion temperature) of about 25° C.

Then, the polishing cloth was used to polish a dummy workpiece for a few minutes, thereby developing intimacy between the adhesive and the base plate. Thereafter, a wafer was processed with the polishing cloth under the processing conditions shown in Table 1; specifically, fifty times of polishing (about 30 minutes each time) were repetitively performed.

After the polishing cloth was used in the above-mentioned manner, the polishing cloth was detached from the base plate. The polishing cloth required a maximum peeling force of about 120 Kg, and therefore was not easy to peel off. The peeling force required at an elevated temperature was about 90 Kg at maximum.

TABLE 1

| | |
|---|---|
| Polishing machine | Speed fam Single-side polishing machine (59SPAW) with a base plate (diameter: 59 inches) |
| Wafer to be processed | Silicon monocrystal P (100) wafer (diameter: 8 inches) |
| Polishing cloth | SUBA800 |
| Polishing slurry | NALC02350; diluted by 20 times (manufactured by Nalco Chemical Company) |

TABLE 1-continued

| | |
|---|---|
| Processing pressure | 300 g/cm$^2$ |
| Slurry flow rate | 1000 ml/min. |
| Processing time | 30 min. |

TABLE 2

| | Added amount | Peeling Force | | | Rate of |
|---|---|---|---|---|---|
| | (wt. %) | 23° C. | 60° C. | 70° C. | decrease (%) |
| Example 1 | 0 | 90 | 9 | | 90 |
| Example 2 | 10 | 100 | 10 | | 90 |
| Example 3 | 20 | 125 | 10 | | 92 |
| Example 4 | 30 | 135 | 10 | | 93 |
| Example 5 | 0 | 85 | | 9 | 89 |
| Example 6 | 10 | 100 | | 10 | 90 |
| Example 7 | 20 | 120 | | 10 | 92 |
| Example 8 | 30 | 130 | | 10 | 92 |
| Example 9 | 0 | 90 | 9 | | 90 |
| Example 10 | 0 | 90 | 9 | | 90 |
| Comparative Example | — | 120 | | 90 | 25 |

INDUSTRIAL APPLICABILITY

The exchanging or replacement of a polishing cloth according to the present invention, conducted after each polishing process, is facilitated because the polishing cloth can be easily peeled off a base plate surface simply by heating the base plate and/or the adhesive layer of the polishing cloth.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A polishing cloth comprising:

a polishing cloth substrate;

a first pressure-sensitive adhesive layer formed on a back face of the polishing cloth substrate;

a support formed on a back face of the first pressure-sensitive adhesive layer;

a second pressure-sensitive adhesive layer formed on a back face of the support; and a release sheet releasably attached to the second pressure-sensitive adhesive layer, wherein the second pressure-sensitive adhesive layer comprises an adhesive composition, the adhesive composition containing a pressure-sensitive adhesive and a side-chain crystallizable polymer so that the side-chain crystallizable polymer is present in an amount of about 1% to about 30% by weight based on the adhesive composition, and the side-chain crystallizable polymer including as a main component thereof an acrylic acid ester and/or methacrylic acid ester which has a straight-chain alkyl group including 16 or more carbon atoms as a side chain, wherein the adhesive composition contains a tackifier in an amount of about 10% to about 30% by weight, wherein the side-chain crystallizable polymer has a molecular weight of about 2,000 to about 15,000, and wherein adhesiveness of the adhesive composition, measured by a peeling force, is decreased by more than about 90% when heated above about 50° C., with respect to the adhesiveness when measured at 23° C.

2. A polishing cloth comprising:

a polishing cloth substrate;

a pressure-sensitive adhesive layer formed on one face of the polishing cloth substrate; and a release sheet releasably attached to the pressure-sensitive adhesive layer, wherein the pressure-sensitive adhesive layer comprises an adhesive composition, the adhesive composition containing a pressure-sensitive adhesive and a side-chain crystallizable polymer so that the side-chain crystallizable polymer is present in an amount of about 1% to about 30% by weight based on the adhesive composition, and the side-chain crystallizable polymer including as a main component thereof an acrylic acid ester and/or methacrylic acid ester which has a straight-chain alkyl group including 16 or more carbon atoms as a side chain, wherein the adhesive composition contains a tackifier in an amount of about 10% to about 30% by weight, wherein the side-chain crystallizable polymer has a molecular weight of about 2,000 to about 15,000, and wherein adhesiveness of the adhesive composition, measured by a peeling force, is decreased by more than about 90% when heated above about 50° C., with respect to the adhesiveness when measured at 23° C.

* * * * *